United States Patent
Baccolo (10) Patent No.: US 9,978,546 B2
(45) Date of Patent: May 22, 2018

(54) ANTI-EXPLOSION ROTARY SWITCH, PROVIDED WITH VISUAL SIGNALING MEANS AND CONTROL MEANS

(71) Applicant: Soldo S.R.L. Socio Unico, Brescia (IT)

(72) Inventor: Mauro Baccolo, Brescia (IT)

(73) Assignee: Soldo S.R.L., Brescia (IT)

(*) Notice: Subject to any disclaimer, the term of this patent is extended or adjusted under 35 U.S.C. 154(b) by 112 days.

(21) Appl. No.: 15/027,959

(22) PCT Filed: Sep. 8, 2014

(86) PCT No.: PCT/IB2014/064315
§ 371 (c)(1),
(2) Date: Apr. 7, 2016

(87) PCT Pub. No.: WO2015/052602
PCT Pub. Date: Apr. 16, 2015

(65) Prior Publication Data
US 2016/0240334 A1    Aug. 18, 2016

(30) Foreign Application Priority Data
Oct. 7, 2013   (IT) .............................. BS2013A0139

(51) Int. Cl.
*H01H 9/04* (2006.01)
*H01H 19/06* (2006.01)
(Continued)

(52) U.S. Cl.
CPC ......... *H01H 19/06* (2013.01); *F16K 37/0008* (2013.01); *H01H 3/0206* (2013.01); *H01H 9/16* (2013.01); *H01H 2223/002* (2013.01)

(58) Field of Classification Search
CPC ........ H01H 19/06; H01H 9/16; H01H 3/0206; H01H 2223/002; F16K 37/0008
(Continued)

(56) References Cited

U.S. PATENT DOCUMENTS 3,670,274 A    6/1972  Ellison
4,214,133 A *  7/1980  Wolford ............. H01H 36/0073
                                                200/19.21
(Continued)

FOREIGN PATENT DOCUMENTS

CN    201093115    7/2008
DE    40 09 978    10/1990
(Continued)

OTHER PUBLICATIONS

International Search Report and Written Opinion of International Application No. PCT/IB2014/064315 dated Dec. 4, 2014 (8 pages).
(Continued)

*Primary Examiner* — Edwin A. Leon
*Assistant Examiner* — Lheiren Mae A Caroc
(74) *Attorney, Agent, or Firm* — Michael Best & Friedrich LLP (57) ABSTRACT

A rotary switch (4) comprising a switch body (8) which identifies an inner space (10) which rotatably houses a shaft (12) operatively connected to an actuator device external to the switch (4), a distribution valve (32) positioned outside said inner space (10), a pneumatic connector (36) and at least one control means (40), such as a solenoid, operatively connected to the pneumatic connector (36), arranged in the inner space (10). The control means (40) is operatively connected to the external device, the distribution valve (32) is operatively connected to the control means (40) by means of the pneumatic connector (36). Advantageously, the pneumatic connector (36) defines at least one connection channel (44) placing the distribution valve (32) in fluidic connection with the control means (40), wherein inside the connection channel (44) at least one anti-explosion means (52) is inserted, positioned coaxially to the connection channel (44) so as to reduce the through cross-section (56) thereof by a
(Continued)

predefined length of the connection channel (44), said through cross-section (56) being confined on an outer circular crown of the connection channel (44), delimited between an inner side wall (60) of the connection channel (44) and an external lateral wall (64) of the anti-explosion means (52).

19 Claims, 5 Drawing Sheets

(51) Int. Cl.
  *F16K 37/00*  (2006.01)
  *H01H 3/02*  (2006.01)
  *H01H 9/16*  (2006.01)

(58) Field of Classification Search
  USPC ...................................................... 200/302.1
  See application file for complete search history.

(56) References Cited

U.S. PATENT DOCUMENTS

2010/0258412 A1  10/2010 Soldo
2017/0140885 A1*  5/2017 Beltrami ................ H01H 19/06

FOREIGN PATENT DOCUMENTS

EP  1602868  7/2005
EP  2573439  3/2013

OTHER PUBLICATIONS

First Office Action from the State Intellectual Property Office of China for Application No. 201480063017.X dated Oct. 25, 2017 (7 pages, which includes a Statement of Relevance).

* cited by examiner

FIG.9b

ANTI-EXPLOSION ROTARY SWITCH, PROVIDED WITH VISUAL SIGNALING MEANS AND CONTROL MEANS

BACKGROUND

The present invention relates to a rotary switch, and in particular an anti-explosion rotary switch, provided with both visual signaling means and with control means.

SUMMARY

In particular, an anti-explosion switch must be able to prevent the propagation of the flame from inside the switch towards the outside, and it must also be able to withstand the internal pressure exerted in case of explosion inside the box.

The rotary switch is further provided with signalling means, such as an indicator, to provide a visual indication of the operating condition of operation of an actuator device, such as a valve or an actuator, operatively connected to the switch itself. A rotary switch of this type, provided with visual signalling means, is commonly referred to as 'limit switch box', hereinafter called, for brevity, LSB.

The LSB of the prior art usually consists of a body and a cover and internally contain a rotating member or indicator operatively connected to the valve or actuator shaft contained in the body.

The rotating shaft or stem is used for example in connection with cams operating additional devices, mechanical, magnetic, inductive, capacitive switches, reeds, with analogue meter or similar applications/devices.

The rotating members are often provided with visual indicators of the angular position of the valve or actuator shaft, in order to provide, from the outside of the switch, a visual indication of the operating condition of the valve or actuator.

These visual indicators are usually housed on the cover so as to be visible from the outside of the switch: for example, the indicator is typically a disk or cap, integral in rotation relative to the shaft and provided with a relevant template: the template is fixed and acts as a fixed reference for the angular position of the indicator.

The rotary switch according to the present invention is also provided with control means, commonly called valve controller.

Valve controllers, in addition to indicating the valve position, perform the function of controlling it typically using, as control means, solenoids or solenoid valves. The solenoids are arranged within the switch body and must be operatively connected to a distribution valve, arranged externally to the switch body, so that it can control the actuator operatively connected to the switch and also arranged externally to the switch.

In order for the LSB box and valve controller to be actually anti-explosion, special joints must be provided to ensure the correct functional connection between the solenoids and the distribution valve arranged, respectively, inside and outside the switch body.

The prior art solutions involve the use of special anti-explosion filters inserted into through holes made on the wall of the switch body to allow the mechanical and functional connection between the external distribution valve and the internal solenoids. Alternatively, mini connectors with 0.1 mm air passage holes are also used.

However, these solutions have some drawbacks.

In fact, the anti-explosion filters, in order to prevent the risk of flame propagation from inside to the outside of the switch body, significantly reduce the through cross-section of the connection conduits between the distribution valve and the solenoids. This reduction in the cross-section on the one hand creates constraints to the operation of the actuator, and on the other creates maintenance problems; in fact, the filters often tend to become clogged and therefore require frequent replacement. Similarly, also the mini connectors by reducing the through cross-section of the air can create operating problems to the actuator and clogging problems that require the replacement thereof.

The need is therefore felt in the art to provide a switch of the switch box and valve controller type, which is on the one hand anti-explosion, and on the other which does not impose design constraints to the actuator and/or maintenance problems.

In other words, the need is felt to provide a switch of the switch box and valve controller type which has high performance and which requires little maintenance, while being anti-explosion.

Such a need is met by a rotary switch according to claim 1.

Further embodiments of the switch according to the invention are described in the following claims.

BRIEF DESCRIPTION OF THE DRAWINGS

Further features and advantages of the present invention will appear more clearly from the following description of a preferred non-limiting embodiment, wherein.

DETAILED DESCRIPTION

With reference to the above figures, reference numeral 4 generally indicates a switch, preferably of the rotary type, comprising a switch body 8 which defined an inner space 10 which rotatably houses a shaft 12, rotating about a rotation axis X-X, operatively connected to an external actuator device (not shown), such as a valve, an actuator, an electromechanical signaling device to an external system, said external device being arranged outside with respect to the inner space 10.

Shaft 12 rotates about the rotation axis X-X according to the operation of the external device.

Preferably, but not in a binding manner, body 8 is made of metal or externally coated with metal.

The shape, number of walls and geometrical dimensions of the switch body 8 may be of any type and should in no way be considered limiting for the purposes of the present invention.

Shaft 12 may be passing through a bottom 18 of the switch body 8 and may be supported by supports arranged internally and/or externally to the switch body 8, in a known manner.

Shaft 12 may be associated to cams 20 for operating additional devices, such as electrical signalling devices of switches, inductive sensors, proximity sensors and the like. The type of devices listed above should be considered in a simplifying and non exhaustive manner.

In other words, shaft 12 rotates with the external device, such as a valve or an actuator, and by rotating, it performs the function of switch operating, for example by cams, a plurality of devices connected to switch 4.

In this way, according to the operation or operating condition of the external device, such as a valve or an actuator, switch 4 can operate a plurality of devices; the timing between switch 4 and the valve or actuator is ensured by shaft 12 which rotates integrally with the valve or actuator.

Switch 4 further comprises a cover 24, associated with said switch body 8; preferably, cover 28 is associated with the switch body 8 on the side of an open end 26 so as to close said inner space 10, on a side opposite to bottom 18.

Switch 4, comprising the switch body 8, bottom 18 and cover 24, is generally hermetically sealed, so as to be anti-explosion, as better described hereafter.

Preferably, cover 24 is made of metal or is externally coated with metal.

According to an embodiment, cover 24 is provided with an indicator 28 rotatable about said rotation axis X-X, and with an indicator cover 30, indicator 28 being associated in rotation with shaft 12, for example by means of a stem, so as to allow a visual indication of the angular position and/or operating condition of the rotary shaft 12, from the outside of the switch.

The shape, number of side walls and geometrical dimensions of cover 24 may be of any type and should in no way be considered limiting for the purposes of the present invention.

Indicator 28 may have any type of shape; preferably, it is axial-symmetric and has a disc shape.

Indicator 28 shows the operating status of the external device, operatively connected to the shaft, such indications being shown with mechanical, chemical, electrochemical processes or by affixing labels.

Switch 4 includes a distribution valve 32 arranged externally to said inner space 10 of the switch body 8. The distributor valve 32 can be of any type, shape, material and size and is a pneumatically operated valve.

Switch 4 further comprises a pneumatic connector 36 and at least one control means 40, such as a solenoid, operatively connected to the pneumatic connector 36. In other words, the distribution valve 32 is operated by the control means, such as solenoid 40, by means of the pneumatic connector 36.

Both the pneumatic connector 36 and the control means 40 are positioned in the inner space 10 of the switch body 8.

The control means 40 is in turn operatively connected to the external device, and the distribution valve 32 is operatively connected to the control means 40 by means of the pneumatic connector 36, so as to selectively operate the distribution valve 32 itself.

The pneumatic connector 36 defines at least one connection channel 44 placing the distribution valve 32 in fluidic connection with the control means 40, wherein the connection channel 44 crosses the pneumatic connector 36 which in turn crosses a side wall 48 of the switch body 8. According to one embodiment, the connection channel is a cylindrical channel, having an extension axis Y-Y.

Advantageously, inside the connection channel 44 at least one anti-explosion means 52 is inserted, positioned coaxially to the connection channel 44 so as to reduce the through cross-section 56 thereof by a predefined length of the connection channel 44.

Advantageously, at the anti-explosion or dust-prevention means 52, the through cross-section 56 is confined on an outer circular crown of the connection channel 44, delimited between an inner side wall 60 of the connection channel 44 and an external lateral wall 64 of the anti-explosion means 52.

Figure 1:
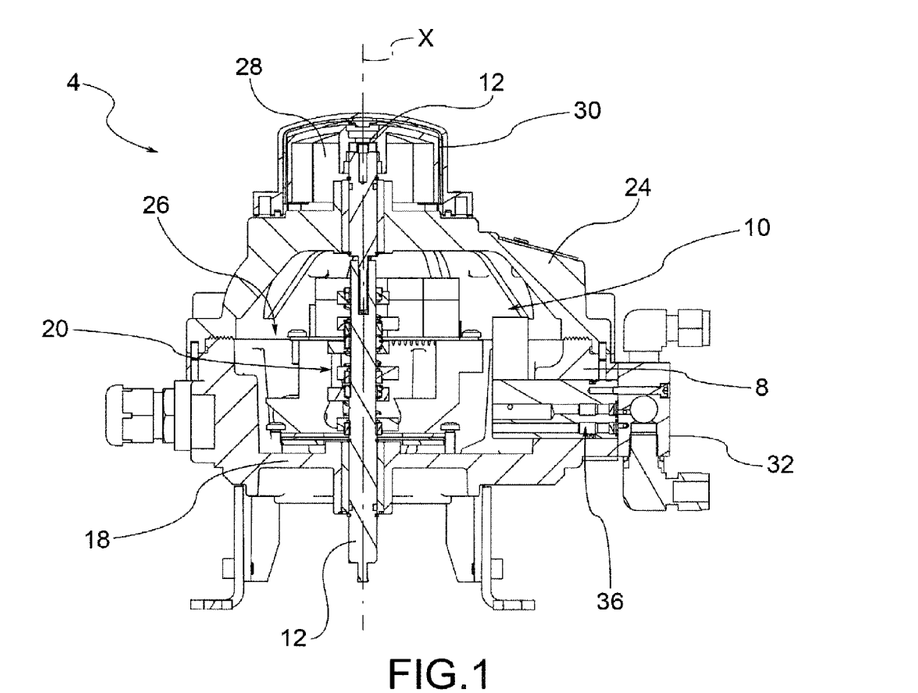
FIG. 1 shows a sectional view in assembled configuration of a switch according to an embodiment of the present invention.
Figure 2:
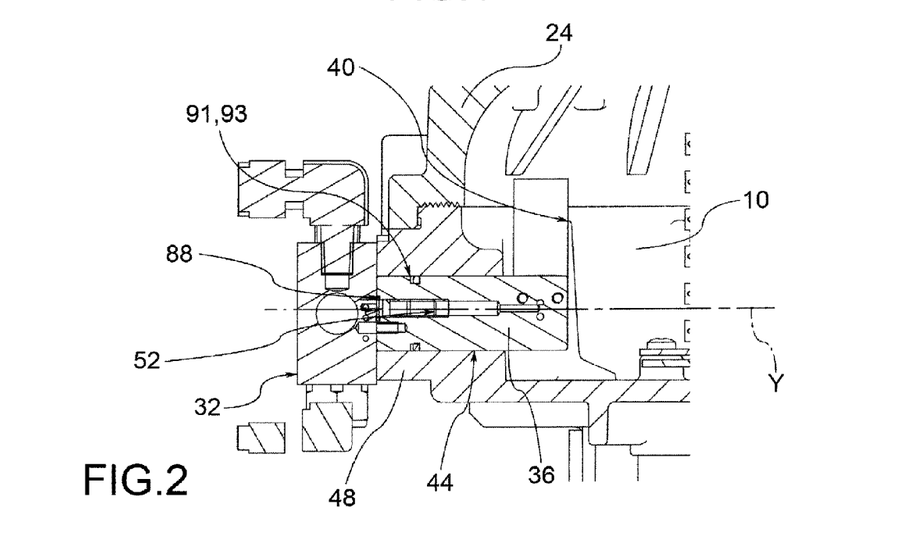
FIG. 2 shows a view of the enlarged detail II in FIG. 1.
Figure 3:
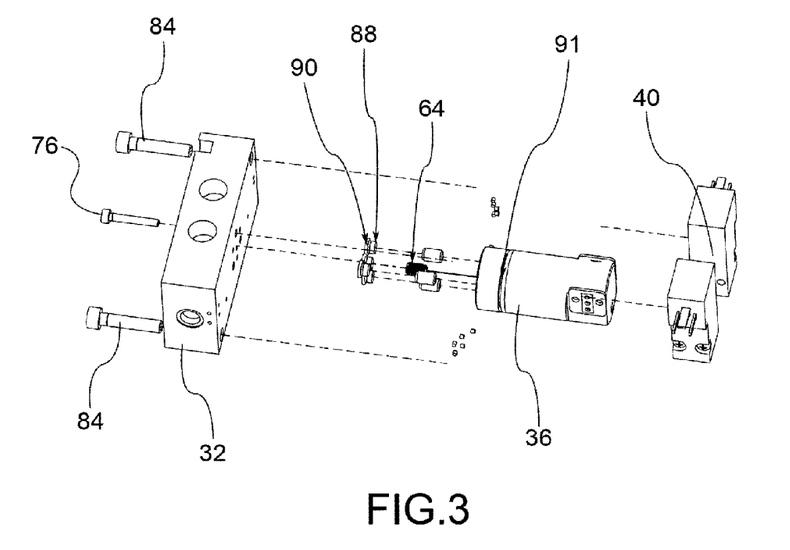
FIG. 3 shows a perspective view in separate parts of some components of a switch according to the present invention.
Figure 4:
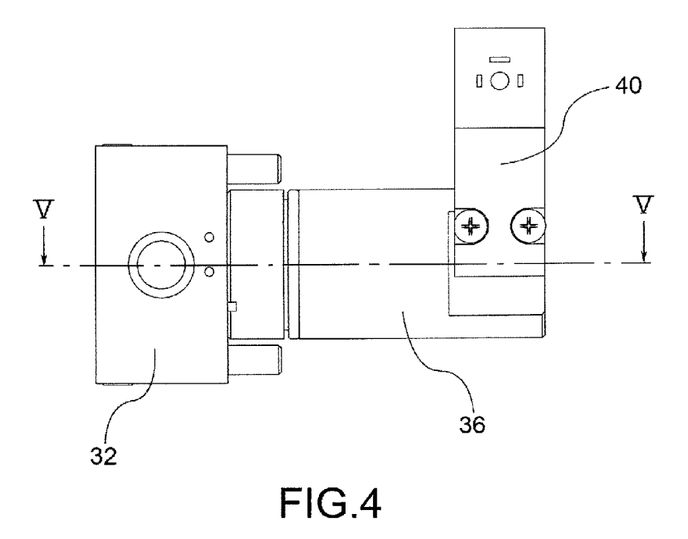
FIG. 4 shows a side view of the components of the switch in FIG. 3, in an assembled configuration.
Figure 5:
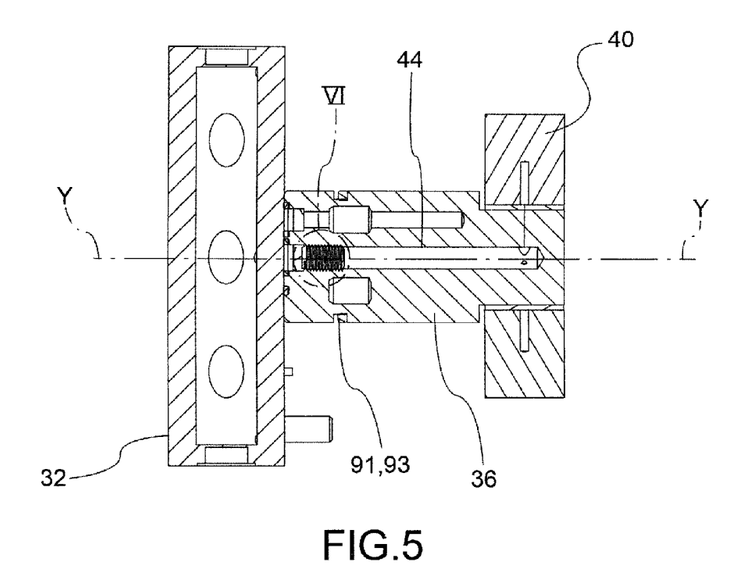
FIG. 5 shows a sectional view of the set of components in FIG. 4, along the section plane V-V in FIG. 4.
Figure 6A:
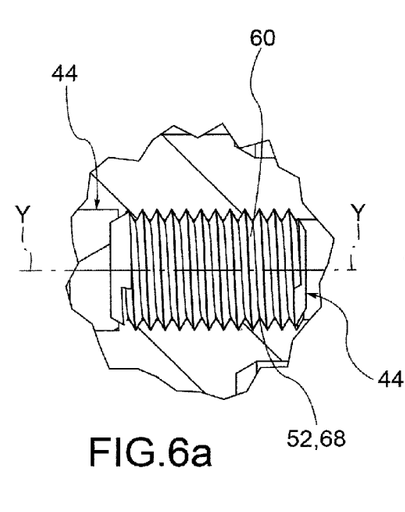
FIGS. 6*a*-6*b* show sectional views of the enlarged detail VI in FIG. 5.
Figure 6B:
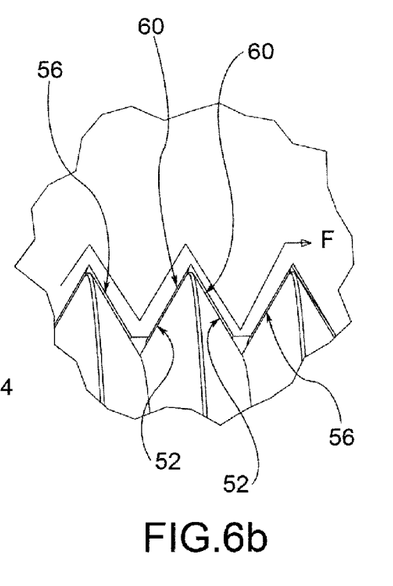
Figure 9A:
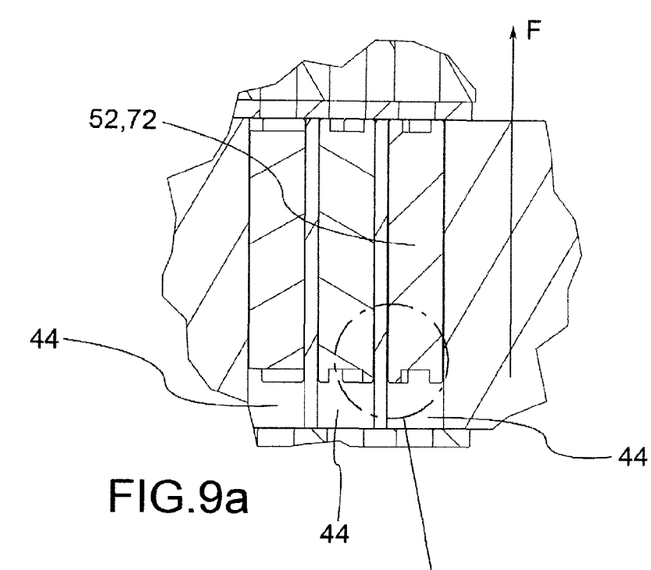
FIGS. 9*a*-9*b* show sectional views of the enlarged detail IX in FIG. 8.
Figure 9B:
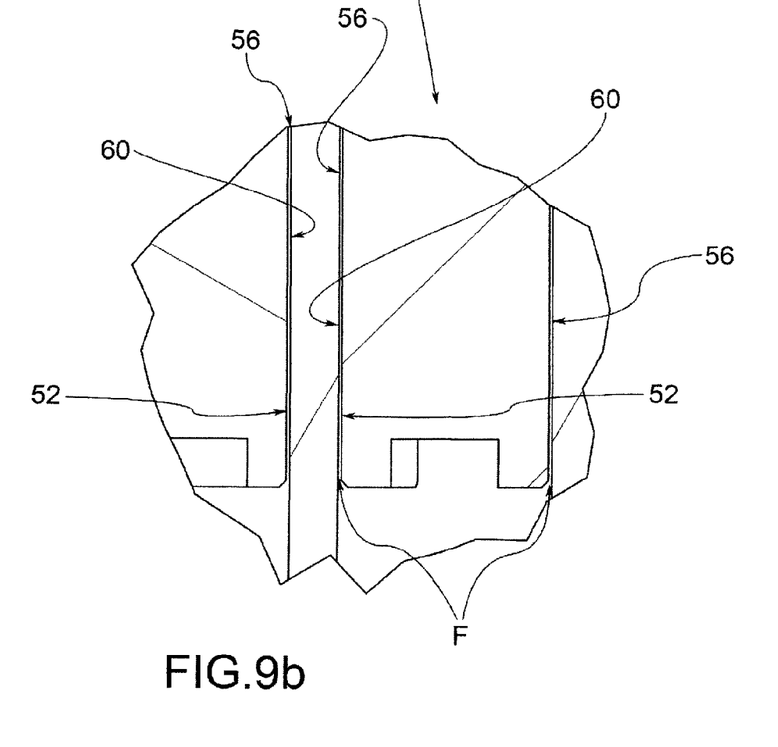

In FIGS. 6b and 9b, the fluid path, along said through cross-section 56, is shown with arrow F said passage section According to a possible embodiment (FIGS. 3-6), the anti-explosion means 52 comprises a metric nut or a metric screw 68, screwed onto a corresponding nut thread made on the inner side wall 60 of the connection channel 44, so as to delimit a through cross-section 56 having a helical pattern.

Figure 7:
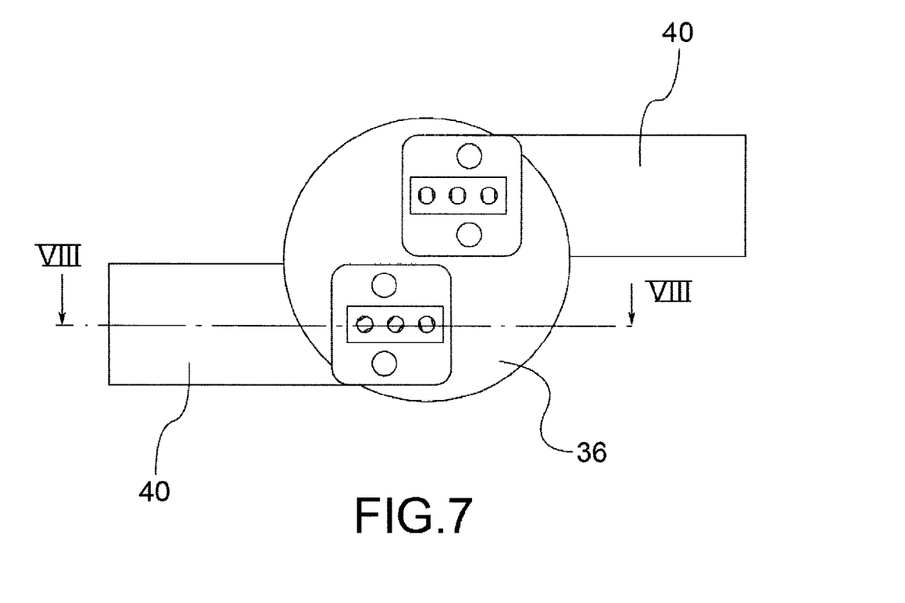
FIG. 7 shows a side view of the components of the switch in FIG. 3, in an assembled configuration, according to a further embodiment of the present invention.
Figure 8:
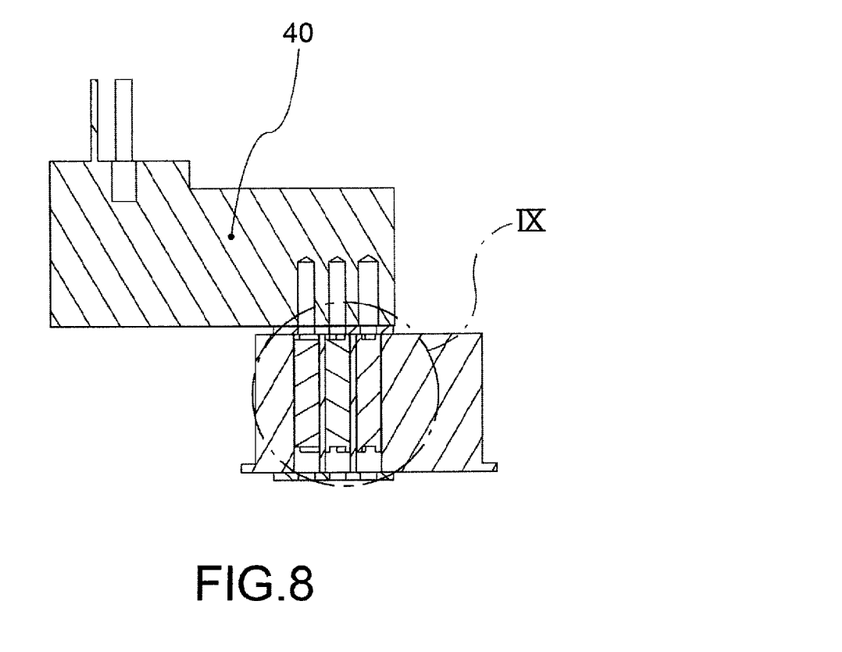
FIG. 8 shows a sectional view of the set of components in FIG. 7, along the section plane VIII-VIII in FIG. 7.

According to a further embodiment (FIGS. 7-9), the anti-explosion means 52 comprises a calibrated cylinder 72, positioned coaxially to said connection channel 44, so as to define a through cross-section 56 in the shape of a circular crown.

Switch 4 includes first mechanical connection means 76 between the distribution valve 32 and the pneumatic connector 36, said first mechanical connection means 76 being inserted in the pneumatic connector 36 which in turn crosses the side wall 48 of the switch body 8.

Such first mechanical connection means 76 thus have the function of fixing the distribution valve 32 with the pneumatic connector 36.

Switch 4 further comprises second mechanical connection means 84 between the distribution valve 32 and the switch body 8; the second mechanical connection means 84 perform the function of connecting the distribution valve 32 to the switch body 8 and, in particular, to the side wall 48 of the switch body 8, in order to have a rigid connection between the two components and to ensure the pressure seal also by means of the sealing devices, such as sealing means or sealants 90.

For example, the first and/or second mechanical connection means 76, 84 of the distribution valve 32 are threaded connection means which sealingly engage in the side wall 48 of the switch body 8, so as to prevent the exit of gas and/or flames from the inner space 10 towards the outside.

According to an embodiment, between the distribution valve 32 and the anti-explosion means 52 there are inserted air filtering means 88 and sealing means or sealants 90.

Said air filtering means 88 or sealing means 90 are inserted into the connection channel 44.

For example, said air filtering means 88 or sealing means 90 comprise porous filters and/or O-ring type gaskets.

Advantageously, the pneumatic connector 36 is of such a size as to ensure that the connection joint between the connector 36 and the body wall 48 does not permit the exit of the flame in the case of an explosion inside the inner space 10. By size of the pneumatic connector it is meant both its section and its length, the length being measured with respect to an axis parallel to said extension axis Y-Y, and the section being measured with respect to a section plane perpendicular to the same extension axis Y-Y.

The pneumatic connector 36 is also provided with a sealing gasket 91 which allows the seal of switch 4 to the entrance of water or dust.

Said sealing gasket 91 is for example housed in a groove 93 made on the outer surface of the pneumatic connector 36.

As can be appreciated from the description, the switch of the present invention allows overcoming the drawbacks of the prior art.

Advantageously, the present invention allows obtaining a rapid assembly, inside the switch box, of the subassembly formed by the connection block, provided with the flame retardant joint, and of the control devices, such as the solenoid valves.

Furthermore, the solution according to the invention is particularly compact.

The distribution valve also acts as a locking element of the connection block via the respective screws; these also have the task of withstanding the internal pressure exerted on the block in the case of explosion inside the box.

In this way, the structure of the box is particularly resistant in cases of explosion.

As seen, the connection between the control devices, arranged inside the box, and the distribution valve, arranged outside the box, is anti-explosion and resistant to the entrance of dust and water inside switch 4.

This type of connection is ensured by the presence of joints which always ensure a sufficient passage of air. Therefore, the risk of clogging of the filters, typical of the prior art solutions, is prevented and at the same time there is no risk of propagation of flames outside of the container box or entrance of dust or water.

In fact, the path for the passage of air is always confined to the outer circular periphery of the connection conduits so as to oppose any propagations of said flame front.

The presence of seals 90, 91 and filters 88 ensures the tightness of the system to the entrance of dust and water.

A man skilled in the art may make several changes and adjustments to the switches described above in order to meet specific and incidental needs, all falling within the scope of protection defined in the following claims.

The invention claimed is:

1. Rotary switch (4) comprising
a switch body (8) which identifies an inner space (10) which rotatably houses a shaft (12) rotating around a rotation axis (x-x), operatively connected to an actuator device external to the switch (4),
a distribution valve (32) positioned outside said inner space (10) of the switch body (8) and pneumatically connectable to said external actuator device,
a pneumatic connector (36) and at least one control means (40) operatively connected to the pneumatic connector (36),
the pneumatic connector (36) being at least partially positioned in the wall (48) of the switch body (8),
the control means (40) being positioned in the inner space (10) of the switch body (8),
the control means (40) being operatively connected to the external control device, the distribution valve (32) being pneumatically connectable to the external actuator and operatively connected to the control means (40) by means of the pneumatic connector (36), so as to permit it's selective operation by the control means (40), characterised in that the pneumatic connector (36) defines at least one connection channel (44) placing the distribution valve (32) in fluidic connection with the control means (40), wherein the connection channel (44) crosses the pneumatic connector (36) which in turn crosses a side wall (48) of the switch body (8),
wherein inside the connection channel (44) at least one anti-explosion means (52) is inserted, positioned coaxially to the connection channel (44) so as to reduce the through cross-section (56) thereof by a predefined length of the connection channel (44),
wherein, at the anti-explosion or dust-prevention means (52), the through cross-section (56) is confined on an outer circular crown of the connection channel (44), delimited between an inner side wall (60) of the connection channel (44) and an external lateral wall (64) of the anti-explosion means (52).

2. Switch (4) according to claim 1, wherein said anti-explosion or dust-prevention means (52) comprises a metric nut or a metric screw (68), screwed onto a corresponding nut thread made on the inner side wall (60) of the connection channel (44), so as to delimit a through cross-section having (56) having a helical pattern.

3. Switch (4) according to claim 1, wherein said anti-explosion or dust-prevention means (52) comprises a Calibrated cylinder (72), positioned coaxially to said connection channel (44), so as to define a through cross-section (56) in the shape of a circular crown.

4. Switch (4) according to claim 1, wherein the switch (4) comprises a first mechanical connection (76) between the distribution valve (32) and the pneumatic connector (36), said first mechanical connection (76) passing through a side wall (48) of the switch body (8).

5. Switch (4) according to claim 4, wherein the switch (4) comprises a second mechanical connection (84) between the distribution valve (32) and the switch body (8), the second mechanical connection (84) has the function of connecting the distribution valve (32) to the switch body (8) so as to have a rigid connection between the two components.

6. Switch (4) according to claim 5, wherein said first and/or second mechanical connection (76, 84) of the distribution valve (32) are a threaded connection which sealingly engages in the side wall (48) of the switch body (8), so as to prevent the exit of gas and/or flames from the inner space (10) towards the outside of the switch body (8).

7. Switch (4) according to claim 5, wherein said first and/or second mechanical connection (76, 84) of the distribution valve (32) are a threaded connection which sealingly engages in the side wall (48) of the switch body (8), so as to prevent the entrance of dust in the inner space (10) from outside the switch body (8).

8. Switch (4) according to claim 5, wherein said second mechanical connection (84) of the distribution valve (32) are a threaded connection which sealingly engages in the pneumatic connector (36), so as to prevent the exit of gas and/or flames from the inner space (10) towards the outside of the switch body (8), and to prevent the entrance of dust in the inner space (10) from outside the switch body (8).

9. Switch (4) according to claim 1, wherein air filtering means (88) are inserted between the distribution valve (32) and the anti-explosion means (52).

10. Switch (4) according to claim 1, wherein, sealing means (90) are inserted between the distribution valve (32) and the anti-explosion means (52).

11. Switch (4) according to claim 10, wherein said air filtering (88) or sealing (90) means are inserted inside the connection channel (44), in the pneumatic connector (36).

12. Switch (4) according to claim 10, wherein said air filtering means (88) comprise porous filters and the sealing means (90) comprise O-ring type gaskets.

13. Switch (4) according to claim 1, wherein sealing components (91) are placed between the pneumatic connector (36) and a side wall (48) of the switch body (8).

14. Switch (4) according to claim 13, wherein said sealing elements (91) comprise O-ring type gaskets.

15. Switch (4) according to claim 1, wherein the pneumatic connector (36) is of such a size as to ensure that the connection joint between the connector (36) and the body wall (48) does not permit the exit of the flame in the case of an explosion inside the inner space (10).

16. Switch (4) according to claim 1, comprising a cover (28), joined so as to close said switch body (8), fitted with an indicator (28) joined in rotation to said shaft (12), so as to permit a visual signaling of the angular position and/or operating condition of the rotating shaft (12), from the outside the switch (4).

17. Switch (4) according to claim 1, wherein the actuator device is a valve or an actuator.

18. Switch (4) according to claim 1, wherein the at least one control means (40) is a solenoid.

19. Switch (4) according to claim 5, wherein the second mechanical connection (84) has the function of connecting the distribution valve (32) to the side wall (48) of the switch body (8) so as to have a rigid connection between the two components.

* * * * *